United States Patent [19]

Scholz

[11] 4,430,736
[45] Feb. 7, 1984

[54] CIRCUIT FOR CORRECTING DISTORTIONS IN A PCM TRANSMISSION DEVICE

[75] Inventor: Werner Scholz, Gehrden, Fed. Rep. of Germany

[73] Assignee: Licentia Patent-Verwaltungs-GmbH, Frankfurt, Fed. Rep. of Germany

[21] Appl. No.: 286,167

[22] Filed: Jul. 23, 1981

[30] Foreign Application Priority Data

Jul. 24, 1980 [DE] Fed. Rep. of Germany ....... 3028066

[51] Int. Cl.³ .......................................... G06F 15/353
[52] U.S. Cl. ..................................... 371/31; 364/723; 364/853; 328/151
[58] Field of Search ..................... 371/30, 31; 364/723, 364/853; 375/34, 99; 328/150, 151, 162, 164; 360/38.1, 53; 358/314

[56] References Cited

U.S. PATENT DOCUMENTS

| | | | |
|---|---|---|---|
| 3,544,963 | 12/1970 | Tong | 371/39 |
| 3,629,824 | 12/1971 | Bossen | 371/38 |
| 4,003,020 | 1/1977 | Clarke | 371/37 |
| 4,054,863 | 10/1977 | Goodman et al. | 371/31 |
| 4,146,099 | 3/1979 | Matsushima et al. | 371/31 |
| 4,354,243 | 10/1982 | Ryan et al. | 364/723 |
| 4,370,643 | 1/1983 | Kitamura | 328/151 |
| 4,376,290 | 3/1983 | Shirota | 360/38.1 |
| 4,376,955 | 3/1983 | Reitmeier | 358/314 |

FOREIGN PATENT DOCUMENTS 2757165 7/1978 Fed. Rep. of Germany .

OTHER PUBLICATIONS

Scratch-Free Stereo Playback, Electronics Weekly, Dec. 29, 1976/Jan. 5, 1977, pp. 2-3.
Technical Information, PCM-1 Audio Unit by Sony Corporation, 1978, pp. 31-45.
Iwamura et al., Journal of the Audio Engineering Society, Sep. 1973, vol. 21, No. 7, pp. 535-541.
IEEE Transactions on Magnetics, vol. 5, Sep. 1975, pp. 1230-1233.

*Primary Examiner*—Charles E. Atkinson
*Attorney, Agent, or Firm*—Spencer & Frank

[57] ABSTRACT

In a circuit arrangement for the correction of falsified sample values in a PCM transmission system, which arrangement includes an interpolation member connected for deriving a corrected value to replace each falsified value by interpolation between sample values preceding and succeeding the falsified value in time, the interpolation member is provided with components connected for deriving each corrected value by effecting a weighted combination of the sample value appearing at the output of the interpolation member and preceding the falsified value in time and the next unfalsified sample value succeeding the falsified value in time in order to perform an at least approximately linear interpolation between sample values which are thus combined.

25 Claims, 17 Drawing Figures

CIRCUIT FOR CORRECTING DISTORTIONS IN A PCM TRANSMISSION DEVICE

BACKGROUND OF THE INVENTION

The present invention relates to the corrections of distortions in PCM signals, particulary those stored on digital audio record discs.

PCM transmission devices generally assure a high transmission quality and offer the possibility for substantially reconstititing the original values of incorrect, or disturbed, samples. However, pure data transmission requires a very low residual error probability, whereas for PCM audio transmission devices it is sufficient to reduce residual errors only to a degree which is no longer audible on the playback side.

Interlacing methods, parity checks and redundancy increasing codes are used to secure the data on a PCM transmission path. Residual errors which remain in spite of all these measures can be attenuated by interpolation between undisturbed sample values to the extent that these errors can no longer be noticed in a playback device.

The technical information accompanying the PCM 1 Audio Unit manufactured by Sony (1978) discloses an average value interpolation in which an error word is replaced by the average value of the preceding and of the next following word. The error is thus compensated in such a manner that no audible difference results. The compensation capability realizable with this process is an advance over the process in which the preceding data word is used as a replacement for the disturbed data word.

Elektronics Weekly, Dec. 29, 1976/Jan. 5, 1977, also discloses a method for interpolation of disturbed sample values in which an interpolation is performed between two points between which a disturbed sample occurs.

The known methods fail if an interpolation is to be made between sample values between which there is more than one disturbed sample value. Two or more successive disturbed sample values then result in a noticeable error at the playback end.

SUMMARY OF THE INVENTION

It is therefore an object of the present invention to provide for the possibility of performing an interpolation between samples between which there exist one or a plurality of disturbed samples.

The above and other objects are achieved, according to the invention, in a circuit arrangement for the correction of falsified sample values in a PCM transmission system, which arrangement includes an interpolation member connected for deriving a corrected value to replace each falsified value by interpolation between sample values preceding and succeeding the falsified value in time, by providing the interpolation member with means connected for deriving each corrected value by effecting a weighted combination of the sample value appearing at the output of the interpolation member and preceding the falsified value in time and the next unfalsified sample value succeeding the falsified value in time in order to perform an at least approximately linear interpolation between sample values which are thus combined.

The present invention makes it possible to perform a linear interpolation with up to four intermediate values on the basis of two supporting values. Thus, four successive disturbed sample values can be replaced by performance of a linear interpolation between the leading and trailing supporting values. If n sample values are disturbed, where n is greater than 4, n−4 of the disturbed sample values are initially replaced by the last correct sample value and the last four disturbed sample values are corrected by interpolation between the last transmitted sample value and the next following undisturbed sample value.

At relatively low expense, the circuit according to the invention offers large reserves of correction possibilities so that even at points of high error probability good error reduction is assured. The circuit operates to particular advantage on the analog signal appearing directly after the digital/analog converter, which analog signal is available as a signal of correct amplitude but is composed of discrete portions each having a constant value, or amplitude, for a given time. Subsequent to the interpolation circuit, the value and time discretizations are removed in a lowpass filter.

DESCRIPTION OF THE PREFERRED EMBODIMENTS

Figure 1:
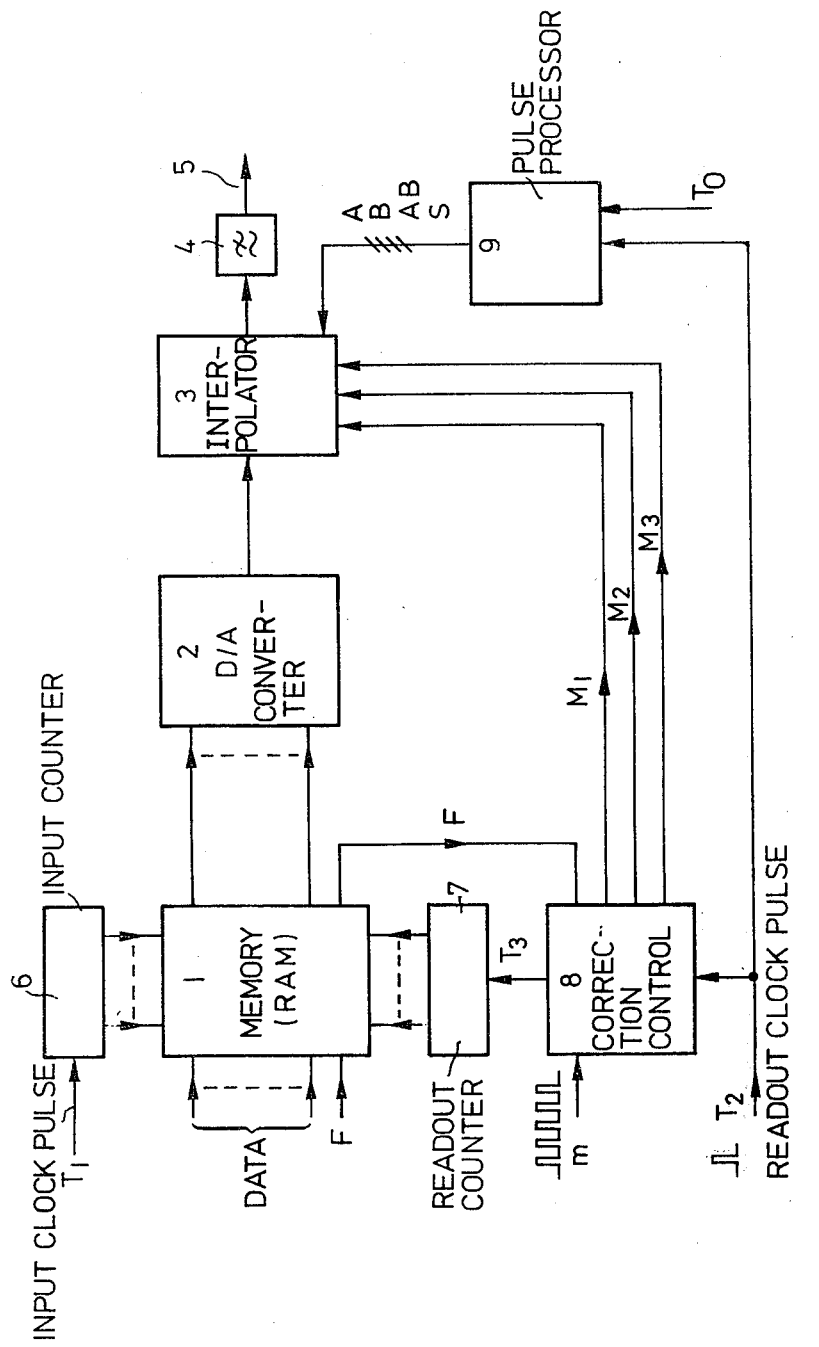
FIG. 1 is a block circuit diagram of a signal processing circuit including an interpolator according to the invention.

FIG. 1 shows a PCM audio record playback circuit including an interpolator according to the present invention. Incoming data, which may possibly carry error word markings, are entered, for example in parallel, into a memory 1, which is, for example, designed as an RAM. All data words not carrying an error marking are fed by memory 1 to a digital/analog converter 2 from where they are fed to an interpolation circuit 3. The interpolation circuit 3 is followed by a lowpass filter 4 from where the signal is fed to an analog output 5.

The input of data into the memory 1 is controlled by an input counter 6 which is clocked by an input clock pulse $T_1$. Readout from memory 1 is similarly controlled by a readout counter 7 which is clocked by clock pulse $T_3$. Error markings F are fed by the memory 1 to a correction control circuit 8. This circuit 8, which is controlled by the readout clock pulse $T_2$ as well as by further clock pulse signals m, supplies signals $M_1$, $M_2$ and $M_3$ to the interpolator 3 which is actuated by the readout clock pulse $T_2$ and the pulse processing stage 9.

Figure 2:
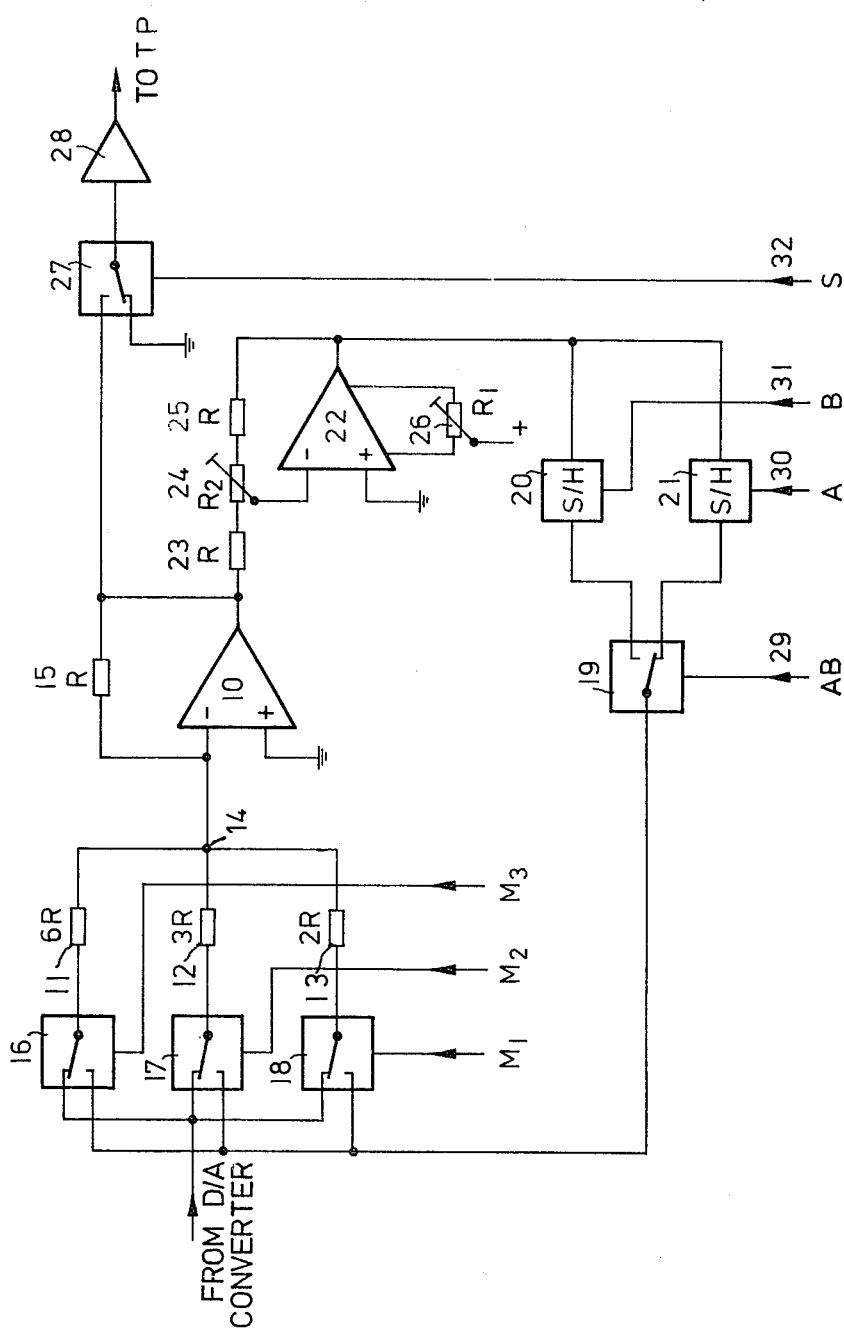
FIG. 2 is a circuit diagram of one preferred embodiment of the interpolator according to the invention.

FIG. 2 shows a preferred embodiment of the interpolation circuit 3 for a single-channel system. The circuit includes a summing amplifier 10 which has three inputs 11, 12 and 13 of different weightings. The different weightings are produced by a resistance network comprising resistors having the relative resistance values 6R, 3R and 2R as marked. The resistors are combined at a junction point 14 and are connected at the inverting, low-ohmic input of the summing amplifier 10. Since the values of the resistors are 6R, 3R and 2R, the total resistance of the three resistances in parallel is R. The value of the feedback resistor 15 of the summing amplifier 10 in this embodiment is also R. Thus the total gain of the summing amplifier is −1.

The inputs 11 to 13, adjacent the ends of the weighting resistors which are remote from the summing amplifier 10, are each connected with the common terminal of a switch 16, 17 or 18. All first inputs of the switches 16, 17 and 18 are connected together and fed to the output of the digital/analog converter 2. The second inputs of the switches 16, 17 and 18 are also connected together and are connected to the common terminal of a switch 19. Switch 19 has two inputs, or switchable contacts, each connected to the output of a respective one of the sample-and-hold circuits 20 and 21.

The signal inputs of the sample-and-hold circuits 20 and 21 are connected together to the output of a phase inverter 22 which shifts the signal coming from summing amplifier 10 by 180° in phase. A series resistance network 23, 24, 25 permits setting of the gain of the phase inverter 22, while a potentiometer 26 permits a zero, or reference, level setting. The output of the summing amplifier 10 is also connected to the first input of a switch 27 from which the signal travels via an impedance converter 28 to the lowpass filter 4. The second input of switch 27 is connected to ground.

The switches 16, 17 and 18 are controlled by signals $M_1$, $M_2$ and $M_3$ from the correction control 8. Switching of the switch 19 requires a control signal AB, the timing of the sample-and-hold circuits is controlled by control signals A and B, and switching of the switch 27 requires a control signal S. These signals are derived by counting devices from a clock signal $T_o$, the frequency of which is an integral multiple of the frequency of $T_2$.

The inputs 11, 12 and 13 of the summing amplifier 10 have relative weightings of 1:2:3. If the three inputs are connected to the same voltage source, the input with the resistance 6R furnishes one current unit, the input 11 with the resistance 3R furnishes two current units and the input 13 with the resistance 2R furnishes three current units. The sample-and-hold circuits 20 and 21 are operated in push-pull, or alternation, with one another in such a manner that one of the two circuits always samples the momentary signal value while the other circuit holds the preceding value. The switch 19 controlled by the signal AB assures that the currently held value of the sample-and-hold circuit 20 or 21 is applied to the second inputs of the three switches 16, 17 and 18. The switch 27 is a keying circuit which converts the output signal into short pulses before it is fed to the lowpass filter 4 via the impedance converter 28.

Figure 3:
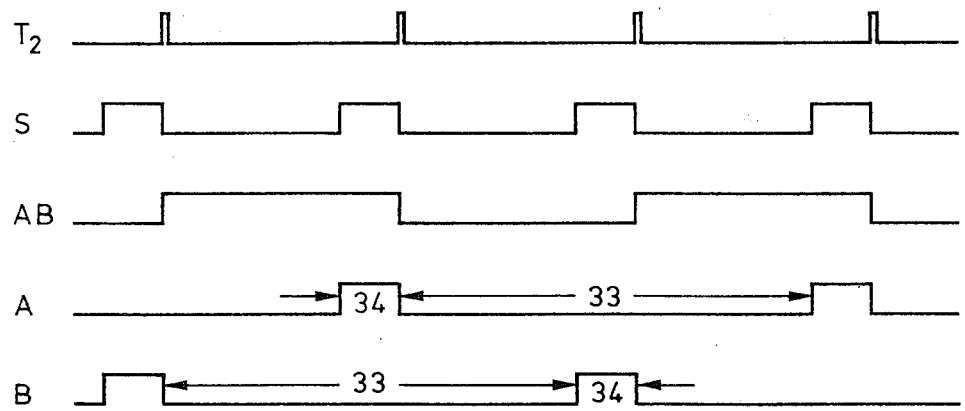
FIG. 3 is a signal waveform diagram of signal patterns at several points in the circuits of FIGS. 1 and 2.

The form of the control signals for the keying circuit 27, the two sample-and-hold circuits 20 and 21 and the switch 10 are shown in FIG. 3. The fourth and fifth lines of FIG. 3 show that the signals A and B are offset from one another but actuate the sample-and-hold circuits 20 and 21 at the same frequency. During each period 34 the signal arriving at the respective sample-and-hold circuits 20 or 21 is being sampled, during each interval 33 the previously sampled value is being held. During the holding time for one signal the switch 19 is switched to receive this signal as shown in FIG. 3, fourth and fifth lines. This has the result that only the held signals of the sample-and-hold circuits 20 and 21 are forwarded via the switch 19.

The control voltages for the three input switches 16, 17 and 18 are generated in a special correction control circuit 8. With the aid of these input switches, the six current units fed to the summing amplifier input 14 are obtained, depending on the interpolation requirements, from the digital/analog converter output, from the sample-and-hold circuits 20 and 21, or partly from each, in dependence on the switch positions of the switches 16, 17 and 18. The relation between the current units arriving at the summation point 14 from the analog/digital converter and the current units arriving from the sample-and-hold circuits 20 and 21 via switch 19, is preferably as shown in the following table assuming a certain number n of successive sample values are marked with error markings F until the next correct sample value:

| n | units from D/A converter 2 | units from S and H circuits 20 and 21 |
|---|---|---|
| 0 | 6 | 0 |
| 1 | 3 | 3 |
| 2 | 2 | 4 |
| 3 | 2 | 4 |
| 4 | 1 | 5 |
| >4 | 0 | 6 |

Figure 4A:
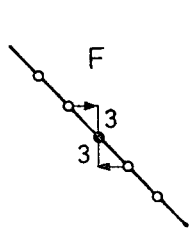
FIGS. 4a to 4f are diagrams illustrating the operation of the interpolation circuit of FIG. 2.

The switching behavior of switches 16, 17 and 18 is set depending on how many successive sample values carry an error marking. FIG. 4 illustrate performance of the interpolation process. In FIG. 4, undisturbed, i.e. correct, sample values are shown as white circles, disturbed, or incorrect, sample values which are replaced by interpolation are shown as black circles. In FIG. 4a, a single value between two correct sample values is to be corrected. The current units of the current from the digital/analog converter are set in correspondence with the above table relative to the units from the sample-and-hold circuits 20 and 21, for n=1, in the ratio of 3:3. The respective last correct sample value, which is the interpolated sample value coming from the sample-and-hold circuits 20 and 21, is present at the second inputs of the switches 16, 17 and 18. The switches 16, 17 and 18 are thus set in such a way that three units of the next following correct sample value are summed with three units of the preceding sample value to produce a value which is equal to the average between the two sample values. This can be accomplished by connecting the switches 16 and 17 to the output of the digital/analog converter 2 while the switch 18 is connected to the output of the sample-and-hold circuits 20 and 21. The parallel connection of 6R and 3R produces 2R so that 2R to 2R is the same as 3:3.

Figure 4B:
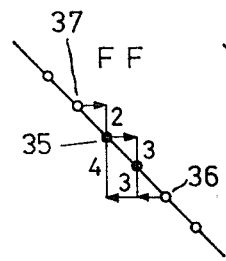

FIG. 4b shows the operation of the interpolation circuit for two successive incorrect sample values to be corrected. In order to obtain the first corrected sample value 35, the switches 16, 17, and 18 are set in such a way that two units of the incoming correct sample value 36 from the digital/analog converter and four units of the preceding sample value 37 which is stored in the sample-and-hold circuit 20 or 21 are combined. For this purpose, switches 16 and 18 are connected to the sample-and-hold circuits while switch 17 is connected to the digital/analog converter. The parallel connection of 6R and 2R results in 1.5R so that the resistance ratio of 1.5R to 3R=2:4. The distance values given in FIG. 4 correspond to this resistance ratio. The ratio between the currents is the reverse. Thus, four current units are furnished by the sample-and-hold circuits 20 and 21 and two current units are furnished by the digital/analog converter 2.

For the correction of the next incorrect sample value, the next correct sample value 36 remains at the digital/analog converter output and the voltage ratio of this sample value to the just corrected sample value 35 is set. This requires the ratio of 3:3 which is obtained by connecting the switches 16 and 17 to the output of the digital/analog converter and by connecting switch 18 to the output of the sample-and-hold circuits 20 and 21. The parallel connection of the resistances 6R and 3R results in 2R so that the total ratio is 3:3.

Thus, the determination of an interpolation value requires knowledge of the preceding correct sample value and of the next following correct sample value. It is necessary to keep the next following correct sample value at the digital/analog converter until all values to be interpolated have been determined. The error signal F possibly attached to the sample values has the effect in the correction control circuit 8 that the readout counter 7, which switches forward the readout addresses for the memory 1, switches the data present at the output of memory 1 sufficiently quickly that the next following correct sample value is present at the output of the memory 1 or of the digital/analog converter 2 before the next value to be interpolated can be calculated.

Figure 4C:
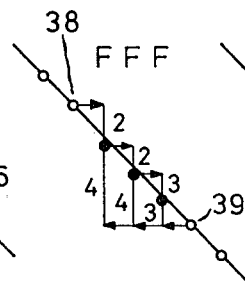
Figure 4D:
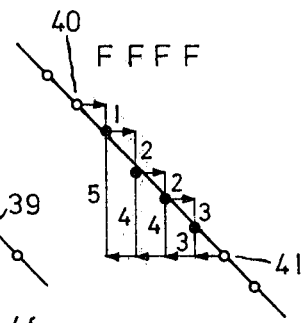

FIGS. 4c and 4d show the determination of the intermediate values to be interpolated between two undisturbed sample values 38 and 39 or 40 and 41, respectively. With the interpolation circuit according to the invention it is possible to interpolate up to four intermediate values approximately linearly between two succeeding undisturbed sample values. The interpolation for three and four intermediate values is only approximately linear since the use of only three inputs with different weightings produces only a limited number of possible combinations at the summing amplifier 10. But since an interpolation in any case can only approximately duplicate the shape of a signal curve, a not quite linear interpolation poses no problem.

The manner of determining the values to be interpolated according to the invention provides a further advantage. The calculation of the values to be replaced is made in each case from the preceding undisturbed or interpolated sample value and the next following undisturbed sample value. The interpolated values therefore orient themselves toward the next following undisturbed sample value and the connection line to the next undisturbed sample value therefore follows the further curve of the sample values.

Figure 4E:
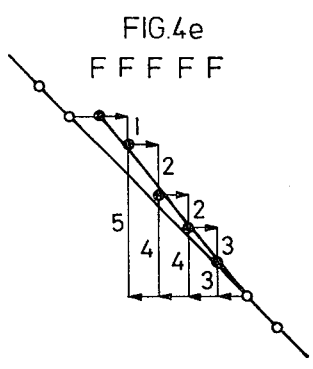
Figure 4F:
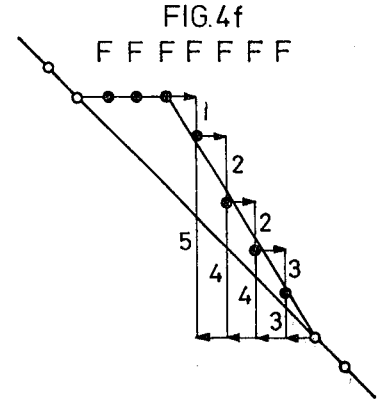

The circuit is also able to replace more than four successive incorrect sample values. But then the interpolation is effected not between the preceding undisturbed or corrected sample value and the next following undisturbed sample value, but rather the preceding undisturbed sample value is fed to the output until only an interval corresponding to four samples is left before the next undisturbed sample value. The last correct sample value is therefore held initially and then the approximately linear interpolation is effected between this sample value and the next following undisturbed sample value. This operation is shown in FIGS. 4e and 4f where five and seven successive incorrect values, respectively, occur.

The table below indicates the control signals $M_1$, $M_2$ or $M_3$ required to control the switches 16, 17 and 18.

| Number of error sample values | Units from D/A converter | Units from memory S & H | $M_1$ | $M_2$ | $M_3$ |
|---|---|---|---|---|---|
| n = 0 | 6 | 0 | 0 | 0 | 0 |
| n = 1 | 3 | 3 | 1 | 0 | 0 |
| n = 2 | 2 | 4 | 1 | 0 | 1 |
| n = 3 | 2 | 4 | 1 | 0 | 1 |
| n = 4 | 1 | 5 | 1 | 1 | 0 |
| n = 5 | 0 | 6 | 1 | 1 | 1 |
| n > 5 | 0 | 6 | 1 | 1 | 1 |

The switches 16, 17 and 18 are set according to the above table so that the respective line, i.e. n value, for the sample values still to be corrected is used. Thus, the interpolation is performed point for point from the respective last output value of the interpolation circuit. The sample values fed from memory 1 to the digital/analog converter are used directly only if no error marking is present. In addition to the respective next sample value, up to five further sample values stored in memory 1 can be checked for error markings between two evaluation intervals of the digital/analog converter.

If more than four successive values carry an error marking, the last output value of the interpolation circuit is retained as the output signal until an error free sample value is again available at a spacing of four sampling intervals. The analog value obtained in this way from this error-free value is then used as the supporting value during the next four interpolation processes while the second supporting value is the respectively preceding output value of the interpolation circuit. The circuit according to the invention precisely replaces one or two missing values by linear interpolation. For three and four successive errors, the interpolation is only approximately linear.

The offset setting element 26 and the gain setting element 24 are connected to the phase reversal stage 22. This permits matching with the aid of the setting elements 24 and 26 for the purpose of forming optimum equivalent values during interpolation.

This is done as follows:

A strongly disturbed PCM signal, i.e. containing artificial interference, is initially employed to take care that all three switches 16, 17 and 18 are continuously actuated, i.e. continuously switched from one to the other position. Then, at a 0 audio level, the offset voltage of the phase reversal stage 22 is set with the aid of the setting regulator 26 in such a way that upon switching the artificial interference in or out the noticeable difference in the noise at the output is as small as possible.

The regulator 24 is set according to the same method, only this time a sine signal of, e.g., 800 Hz and medium level is used. With the aid of the adjuster 24, the gain of the phase reversal stage 22 is then set in such a manner that switching of the artificial interference there in and out gives rise to no noticeable change, or the smallest achievable change, in the output signal. With these two simple matching processes, which can be effected auditorily or with the aid of instruments, optimum error coverage is assured.

The successive individual data words arrive in parallel at the memory 1 of FIG. 1 which is here shown as a parallel memory, and are initially stored in the memory. X bits of a data word or sample word, respectively, with an additional bit for the error marking F can be received from x+1 parallel lines and can be forwarded to x+1 parallel lines. The data can either be fed into the memory 1 in an interlaced sequence, the de-interlacing then taking place in the memory, or can be written into the memory already in their de-interlaced arrangement, i.e. in their original order.

Input counter 6 and readout counter 7 are matched to one another in such a way that the readout takes place in de-interlaced form, i.e. in the original sequence of the sample values. The input clock pulse $T_i$ which controls the input counter 6 is coupled to the incoming signal. It thus also contains any time error of the incoming signal. Readout takes place under control of a readout clock pulse $T_2$ having a constant repetition rate so that such time errors are removed. The average frequency of $T_1$ must of course coincide with that of $T_2$ and the memory must have a large enough capacity that it not only permits correction of the time fluctuations of $T_1$ but also always has sufficient sample words available for interpolation.

The sample values provided with an error marking F cannot be used to form the output signal. In simple PCM transmission systems there are, for example, all sample values from blocks recognized as containing errors. In systems in which parity signals are also transmitted so as to effect a genuine correction of the digital signal, it may happen at points of high error density that such a correction cannot be made. These remaining errors can be masked only by interpolation.

Each readout clock pulse $T_3$ applied to the readout counter 7 assures that the next sample value of the original sequence including the error marking bit is made available at the memory outputs of memory 1. The x bits of the data word are then fed to the digital/analog converter whose output sets itself to the associated analog value. At the output of the digital/analog converter, the sample values are then still present with a discrete amplitude and for a given period of time. The error marking bit attached to each disturbed data word is fed to the correction control 8.

Figure 5:
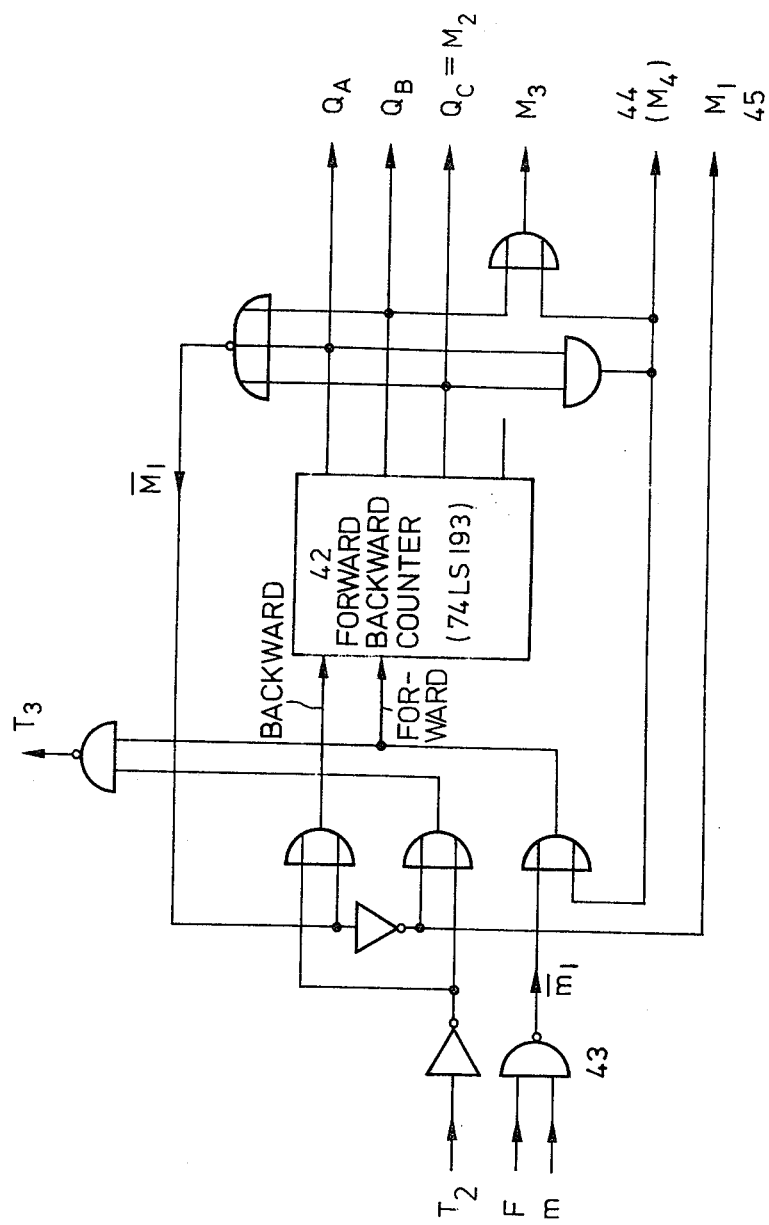
FIG. 5 is a circuit diagram of one embodiment of the circuit 8 of FIG. 1 for controlling the interpolation circuit of FIG. 2.
Figure 6:
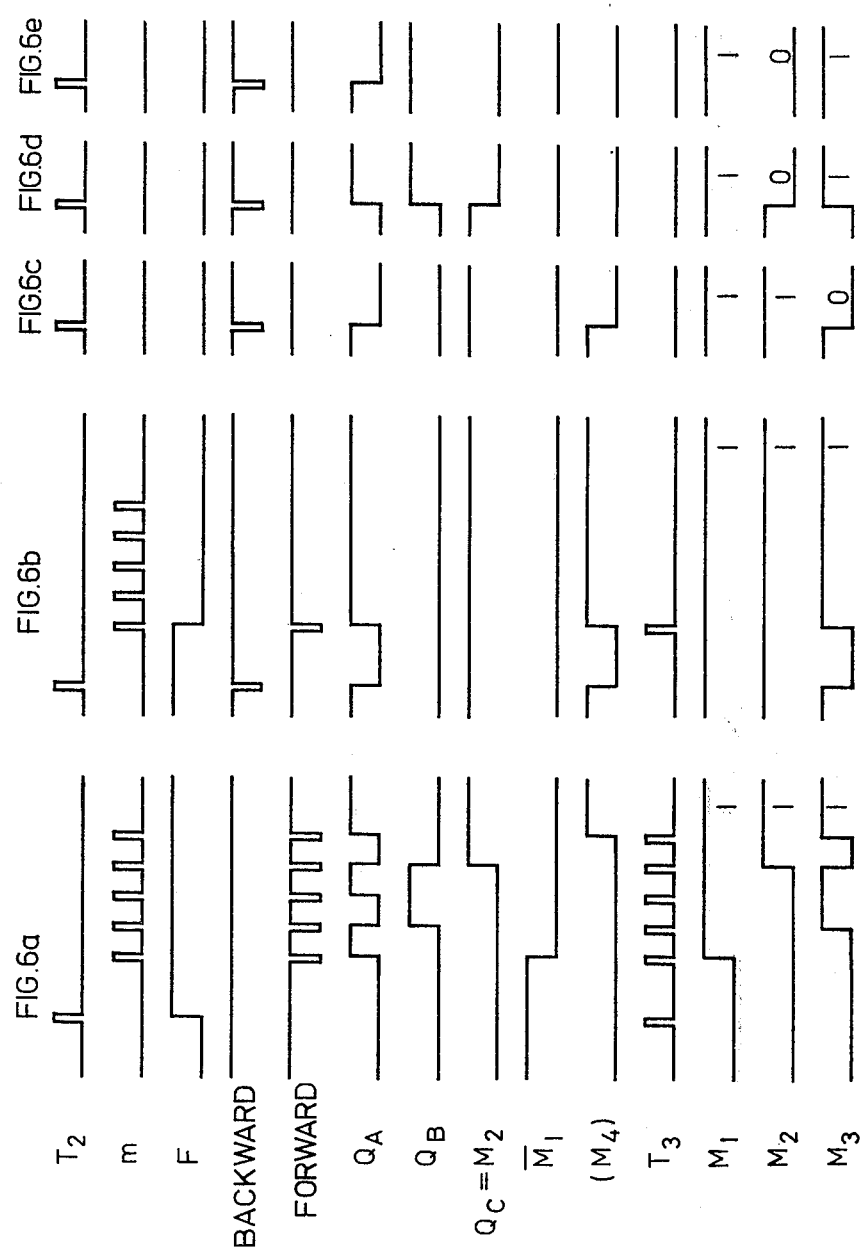
FIGS. 6a to 6e are signal waveform diagrams illustrating operation of the circuit of FIG. 5 in response to various signal conditions.

FIG. 5 shows one embodiment of a circuit for the correction control 8. A corresponding diagram illustrating the signals present at various points in the circuit is shown in FIG. 6. Each pulse $T_2$ initiates a new sampling interval. If no error marking is present and the forward-/backward counter 42 is in its starting position, i.e. $M_1=0$, each pulse $T_2$ generates a pulse $T_3$ for the readout counter 7 so that the data words are fed to the digital/analog converter in the correct, uninterrupted sequence. When all three control signals $M_1$, $M_2$ and $M_3=0$, the input of the interpolator is connected only to the output of the digital/analog converter. The undisturbed signal thus passes through the interpolator without being influenced.

After each $T_2$ pulse, 5 clock pulses m are generated. As long as an error marking F is present, the pulses m can pass through the input gate 43. These pulses are counted forward in the forward/backward counter 42 until a count of 5 is reached. Additionally, the m pulses which pass through gate 43, in inverted form, reach the readout counter 7 as $T_3$ pulses. The readout counter 7 can thus run ahead of its desired state by up to 5 counting units and can thus check a sample value which normally would occur up to 5 sampling intervals later for error markings.

The voltage waveforms shown in FIG. 6a occur during the first five successive sampling intervals when, after a period without errors, six successive values suddenly have an error marking F. The pulse $T_2$ switches the readout counter 7 one step ahead. The output of counter 7 then constitutes the address of a sample word which includes the error marking F. Since the forward-/backward counter 42 is in its starting position and the next five addresses also contain error markings, the maximum number of 5 m pulses switches the forward-/backward counter 42 as well as the readout counter 7 forward by five steps. Since no value without error marking was found, the interpolator had to reuse the preceding correct output value. This is done since the output of counter 42 is binary "101" (=5) so that each of the control signals $M_1$, $M_2$ and $M_3=1$. Therefore, the input of the summing amplifier 10 is connected exclusively to the output of the sample-and-hold circuit 20 or 21. The forward switching of the forward/backward counter 42 must therefore take place within the interval lying between the evaluation of two sample values. If the forward/backward counter 42 is not in its zero count state, a logic 1 is present at output 45. As long as this is the case, each subsequent pulse $T_2$ will not reach the readout counter 7 but serves as a backward counting pulse for the forward/backward counter 42.

In the time interval shown in FIG. 6b, the forward-/backward counter 42 is initially in its final count state, representing decimal 5, and the next pulse $T_2$ sets the count state back by a count of 1, whereupon $M_4$=logic 0. Since the error marking F of the preceding sample value is still present at the input of gate 43, the first one of the following group of m pulses is able to switch the readout counter forward by one step and to provide a further pulse $T_3$. Thus, the forward/backward counter 42 goes back into its final count state (output $M_4$=logic 1).

The address now located in the memory 1 has no error marking (F=0). Since the time spacing between the word at that address and the most recent previously occurring unfalsified or corrected sample word from the next occurring sample value continues to be more than the period of four sampling intervals, here again the preceding output value from interpolator 3 must be held. Thus, $M_1$, $M_2$ and $M_3=1$ remains the same.

Only with the next sampling interval can the actual interpolation begin. The count state of readout counter 7 remains at this error-free address until arrival of the sampling time interval which corresponds to that address. To this point, the signals $M_1$, $M_2$ and $M_3$ follow the pattern required according to the above table. D/A converter 2 always receives the sample word stored at the memory location addressed by counter 7.

FIG. 6c illustrates the time interval when a clock pulse $T_2$ causes counter 42 to count down to a count state of binary "100", or decimal 4. At this time the sample value to be provided is four sample intervals earlier than the next occurring correct sample and switches 16, 17 and 18 of the circuit of FIG. 2 are set so that switches 17 and 18 are connected to receive the signal previously supplied to the interpolator 3, and stored in one of the circuits 20 or 21, and switch 16 is connected to the D/A converter output. Therefore, the signal appearing at summing point 14 is influenced by the previous interpolator output signal five times as much as by the signal then supplied by converter 2.

Similarly, FIGS. 6d and 6e illustrate the respective time intervals when counter 42 counts down to a count state of binary "011", or decimal 3, and binary "010", or decimal 2, whereupon in the circuit of FIG. 2 switches 16 and 18 are connected to switch 19 and switch 17 is connected to the output of converter 2.

In the same manner when counter 42 reaches its count state of decimal 1, switch 18 is connected to switch 19 and switches 16 and 17 are connected to the output of converter 2.

When the forward/backward counter 42 has counted down to its zero count state, the circuit is notified that the rapid counting ahead of the readout counter 7 in order to find an address without error marking has been made up, i.e. the address currently being read out contains the sample word which belongs to the present time interval. The next $T_2$ pulse will thus be fed again to the readout counter and, depending on whether an address with or without error marking is reached, the above described sequence continues.

Figure 7:
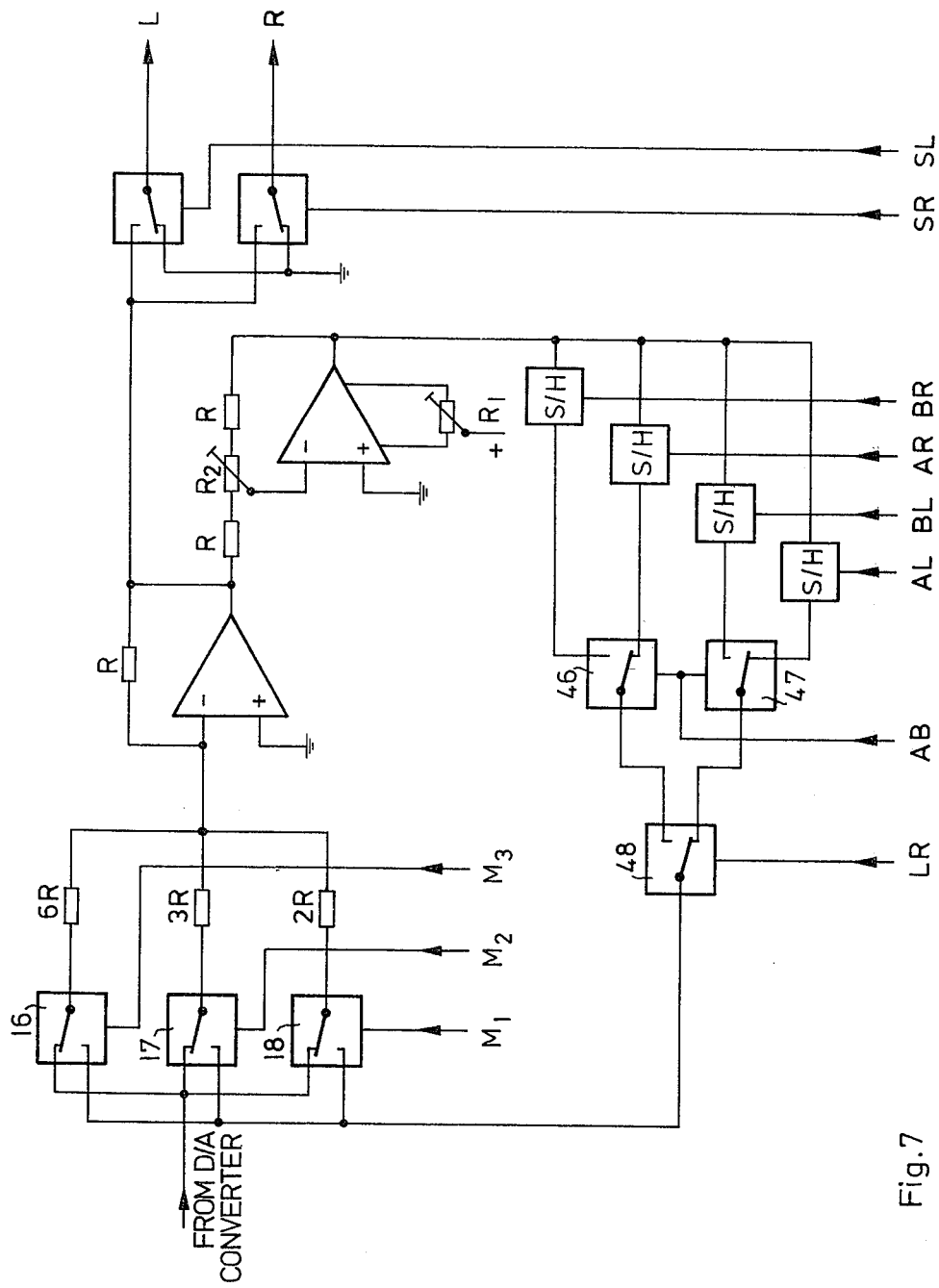
FIG. 7 is a circuit diagram of an interpolator according to the invention for two-channel, or stereo, transmission.

FIG. 7 shows an embodiment of an interpolation circuit according to the invention for processing signals in two channels, for example, for left and right stereo channels. The memory 1, or the digital/analog converter 2, alternatingly furnishes left and right sample values. Since two sample-and-hold circuits are required per channel, whose held values are conducted via the switches 46 and 47, a further switch 48 is provided to alternately connect the common terminals of switches 46 and 47 to the second inputs of the switches 16, 17 and 18. Each of switches 46 and 47 is alternatingly connected to each of its associated sample-and-hold circuits.

Figure 8:
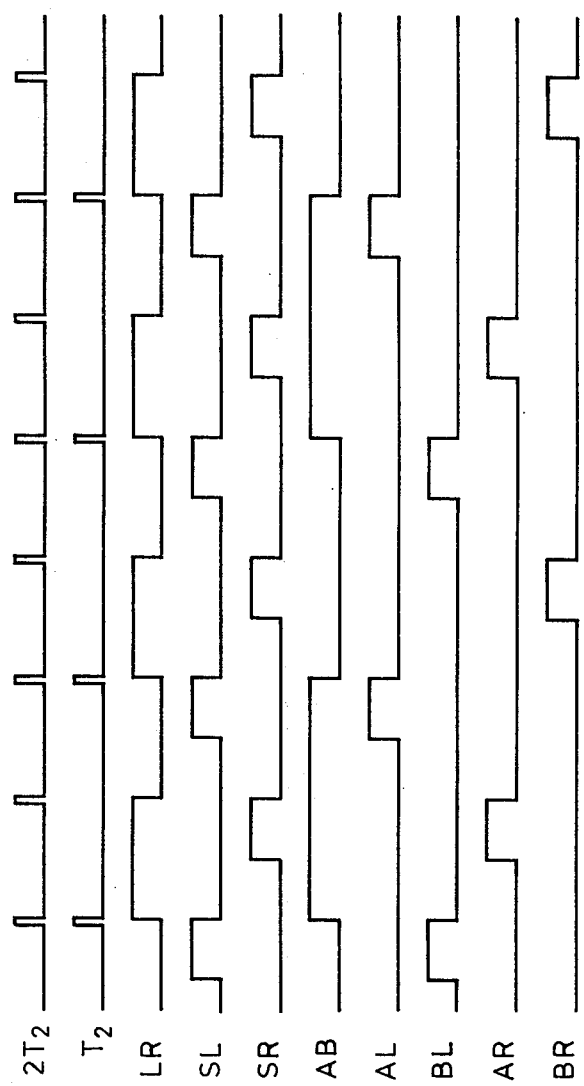
FIG. 8 is a signal waveform diagram illustrating operation of the circuit of FIG. 7.

FIG. 8 shows the control signals required for processing the sample value signals. The signals $M_1$, $M_2$ and $M_3$ required to control the switches 16, 17 and 18 can here, too, be generated in the circuit according to FIG. 5. It must only be considered that the pulses of FIG. 6a–e each are provided for a pair of samples (right and left). Always both samples of a pair are treated in the same manner. Switching from the left sample value to the right sample value may take place, for example, each time midway between two $T_2$ pulses by switching the readout counter 7. Correspondingly, a modification for a four-channel system can also be used.

At relatively low cost, circuits according to the invention offer large reserves of correction possibilities, so that even at points of high error frequency good error coverage is assured without uncontrollable signals being generated. The circuit makes it possible to exactly linearly interpolate up to four intermediate values and to correct more than four intermediate values in such a manner that with n values to be corrected the first n−4 values correspond to the preceding sample value and the last four values before a new sample value are interpolated approximately linearly to the next undisturbed sample value. Retention of the last undisturbed sample value during a period of disturbance of longer duration is still freer of disturbance than idling of the signals. In any case, this equivalent value lies in the amplitude range of the instantaneous signal. It is thus prevented with certainty that in a very soft passage there will suddenly occur a loud cracking noise. The entire correction circuit is advisably designed in the form of an integrated circuit which possibly includes, in addition to signal inputs and signal outputs, connections for two adjusters to set offset and gain. The correction circuit can be designed in the form of a CCD circuit (Charge Coupled Device).

It will be understood that the above description of the present invention is susceptible to various modifications, changes and adaptations, and the same are intended to be comprehended within the meaning and range of equivalents of the appended claims.

What is claimed is:

1. In a circuit arrangement having an input for receiving a succession of sample values supplied thereto in a PCM transmission system, for correcting falsified sample values, the improvement comprising:
   correction control means connected for detecting each falsified sample value and determining if the number, N, of falsified sample values received between successive unfalsified sample values exceeds a given plurality, n, of successive falsified sample values; and
   interpolation means having a signal output and connected to said correction control means and operatively connected to said circuit arrangement input for deriving, and supplying to said signal output, a corrected value in place of each falsified sample value, said interpolation means being controlled by said correction control means for replacing, at said signal output, each of the first N-n falsified sample values of a succession of falsified sample values by the last occurring unfalsified sample value, constituting the corrected value, and for deriving, and applying to said signal output, a corrected value for each of the last n falsified values by effecting a weighted combination of the sample value appearing at said signal output and preceding the respective falsified value in time and the next unfalsified sample value in order to perform an at least approximately linear interpolation between the sample values which are thus combined.

2. Arrangement as defined in claim 1 wherein n is equal to 4.

3. Arrangement as defined in claim 1 wherein the system is constructed for playback of digitally recorded audio records.

4. Arrangement as defined in claim 1 wherein the system includes an output portion for reproducing an original analog signal and in which the PCM words are converted into analog sample values having discrete durations and amplitudes, and said interpolation means is connected to receive such analog sample values.

5. Arrangement as defined in claim 1 wherein said interpolation means comprise a summing amplifier connected for combining the next succeeding unfalsified sample value with the preceding sample value, said amplifier having inputs of respectively different weightings to each of which is selectively fed one of the sample values to be combined.

6. Arrangement as defined in claim 5 wherein said summing amplifier has three inputs which impart weightings in a ratio of 1:2:3 to signals applied thereto.

7. Arrangement as defined in claim 6 wherein said summing amplifier includes an operational amplifier having an inverting input, and said inputs comprise three resistors having the resistance values 2R, 3R and 6R, respectively.

8. Arrangement as defined in claim 7 wherein said summing amplifier further comprises a feedback resistance having a resistance value of R and connected between said inverting input and the output of said operational amplifier so that when said three resistors are connected in parallel, the total gain of said summing amplifier is −1.

9. Arrangement as defined in claim 5 wherein said interpolation means further comprise a plurality of switches each connected to one of said amplifier inputs and switchable between a first state in which it delivers to its associated input the next succeeding unfalsified sample value and a second state in which it delivers to its associated input the last sample value supplied to said interpolation means signal output.

10. Arrangement as defined in claim 9 further comprising an addressable memory connected to said interpolation means for providing each next succeeding unfalsified value to said interpolation means whenever there is no more than the given number of successive falsified values between that unfalsified value and the signal value at said interpolation means signal output.

11. Arrangement as defined in claim 10 wherein each falsified sample value is supplied to said arrangement with an accompanying error marking, and said addressable memory contains a plurality of addressable memory locations, and further comprising read-in addressing means controlled by read-in clock pulses and connected to said memory for reading representations of successive sample values supplied to said arrangement into successive memory locations, and read-out addressing means controlled by read-out clock pulses and connected to said memory for reading out therefrom representations stored in successive memory locations, and said correction control means are connected to respond to error markings accompanying falsified sample values for controlling the repetition rate of the read-out clock pulses in a manner to respond to the presence of falsified sample values so as to effect read-out of the next succeeding unfalsified sample value representation or of the next sample value representation succeeding a given maximum number of falsified sample value representations.

12. Arrangement as defined in claim 1 wherein said interpolation means comprises memory means connected for storing the last sample value supplied to said signal output.

13. Arrangement as defined in claim 12 wherein said memory means comprise two sample-and-hold modules connected in parallel and arranged to sample successive values supplied to said interpolation means signal output in alternation.

14. Arrangement as defined in claim 13 wherein said interpolation means comprise a summing amplifier connected for combining the next succeeding unfalsified sample value with the sample value at said signal output, said amplifier having inputs of respectively different weightings to each of which is selectively fed one of the sample values to be combined, and a phase reversal stage with adjustable gain and reference level adjuster connected in series between the output of said summing amplifier and said modules.

15. Arrangement as defined in claim 1 wherein each falsified sample value is supplied to said arrangement with an accompanying error marking, and said correction control means are connected to detect such error markings and to control the relative weightings of the two sample values which are combined to derive each corrected value as a function of the number of successively supplied sample values accompanied by an error marking succeeding the sample then appearing at said signal output of said interpolation means.

16. Arrangement as defined in claim 15 wherein said interpolation means are capable of establishing relative weightings of the next unfalsified sample value succeeding the falsified value for which the corrected value is being derived and the sample value appearing at the output of said interpolation means in ratios of 0:6; 1:5; 2:4; 3:3; 4:2; 5:1; or 6:0.

17. Arrangement as defined in claim 15 wherein, for deriving each corrected value, said interpolation means establish the following ratios of relative weightings of the next unfalsified sample value succeeding the falsified value for which the corrected value is being derived to the sample value appearing at said signal output of said interpolation means:
  a ratio of 3:3 when the value being corrected immediately precedes said next unfalsified sample value;
  a ratio of 2:4 when the value being corrected is the second or third successive falsified value preceding said next unfalsified sample value;
  a ratio of 1:5 when the value being corrected is the fourth successive falsified value preceding said next unfalsified sample value.

18. Arrangement as defined in claim 15 wherein said correction control means comprise a forward/backward counter connected for counting the number of successive falsified sample values supplied to said arrangement and a logic circuit connected to the outputs of said counter to derive therefrom control signals determining the relative weightings of the two sample values which are combined to derive each corrected value in dependence on the number of successive sample values still to be corrected.

19. Arrangement as defined in claim 15 wherein sample values are supplied to said interpolation means at a selected rate and further comprising: an addressable memory connected to said interpolation means and containing a plurality of addressable memory locations with representations of successive sample values supplied to said arrangement being read into respective ones of successive memory locations; and read-out addressing means controlled by read-out clock pulses and connected to said memory for reading out therefrom representations stored in successive memory locations, and said correction control means are connected to respond to error markings accompanying falsified sample values for causing said read-out addressing means to shift from one successive memory location to the next, up to a maximum of four locations, until reaching a location containing a sample value representation not accompanied by an error marking, during a time period located between the supplying of successive sample values to said interpolation means.

20. Arrangement as defined in claim 1 wherein the sample values are in the form of sample value words representing a combination of right and left channel signal values of a stereophonic signal.

21. Arrangement as defined in claim 20 wherein the sample value words constitute two stereo signals combined into a quadraphonic signal.

22. Arrangement as defined in claim 20 wherein said interpolation means comprise two memories each connected for storing the last sample value of a respective channel supplied to said interpolation means output and each said memory is composed of two sample-and-hold modules connected in parallel and arranged to sample in alternation successive signal values of the associated channel supplied to said interpolation means signal output.

23. Arrangement as defined in claim 1 wherein said interpolation means comprise: a summing amplifier connected for combining the next succeeding unfalsified sample value with the sample value at said signal output, said amplifier having inputs of respectively different weightings to each of which is selectively fed one of the sample values to be combined; and memory means connected for storing the last sample value supplied to said signal output, each falsified sample value is supplied to said arrangement with an accompanying error marking, said correction control means are connected to detect such error markings and to control the relative weightings of the two sample values which are combined to derive each corrected value as a function of the number of successively supplied sample values accompanied by an error marking succeeding the sample then appearing at the output of said interpolation means, and said correction control means, said memory and said summing amplifier are combined in a common integrated circuit.

24. Arrangement as defined in claim 23 wherein said integrated circuit is a CCD structure.

25. A method for correcting falsified sample values in a succession of sample values received in a PCM transmission system, comprising:

detecting each falsified sample value and determining if the number, N, of falsified sample values received between successive unfalsified sample values exceeds a given plurality, n, of successive falsified sample values; and deriving, and supplying to a signal output, a corrected value in place of each falsified sample value, said step of deriving comprising replacing, at the signal output, each of the first N-n falsified sample values of a succession of falsified sample values by the last occurring unfalsified sample value, and applying to the signal output a corrected value for each of the last n falsified values by effecting a weighted combination of the sample value appearing at the signal output and preceding the respective falsified value in time and the next unfalsified sample value in order to perform an at least approximately linear interpolation between the sample values which are thus combined.

* * * * *